(No Model.)

S. HARRIS.
ELECTRIC CONTROLLER.

No. 587,733. Patented Aug. 10, 1897.

Witnesses
M. E. Sharpe
Maggie A. McCluster

Inventor:
Samuel Harris
By Richard Eyre
Atty.

UNITED STATES PATENT OFFICE.

SAMUEL HARRIS, OF JOHNSTOWN, PENNSYLVANIA, ASSIGNOR TO THE STEEL MOTOR COMPANY, OF SAME PLACE.

ELECTRIC CONTROLLER.

SPECIFICATION forming part of Letters Patent No. 587,733, dated August 10, 1897.

Application filed January 7, 1897. Serial No. 618,227. (No model.)

*To all whom it may concern:*

Be it known that I, SAMUEL HARRIS, of Johnstown, Cambria county, Pennsylvania, have invented certain new and useful Improvements in Electric Controllers, of which the following is a specification.

My invention relates to that class of electric controllers used upon railway-vehicles to control the current to the motors thereon, and has for its objects the provision of a cheap, simple, and effective arc-extinguishing device, an improved form of locking and step-by-step device, and other improvements to be hereinafter pointed out.

To these ends my invention consists in the novel construction, arrangement, and combination of parts to be described and claimed.

Figure 1:
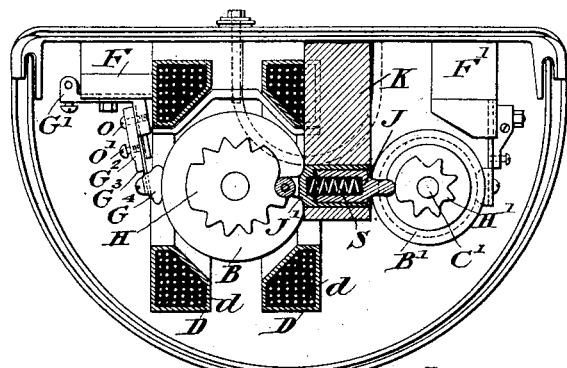
Figure 2:
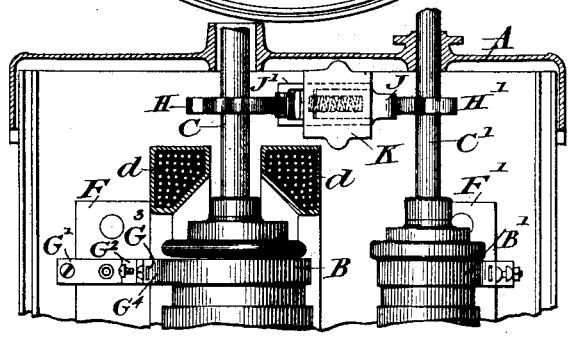
Figure 3:
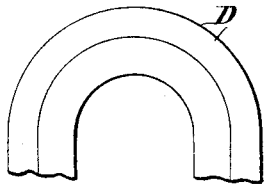
Figure 4:
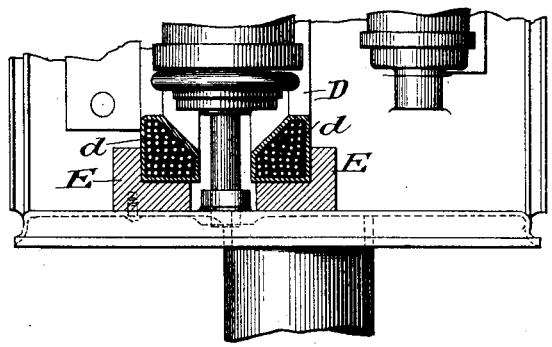
Figure 4:
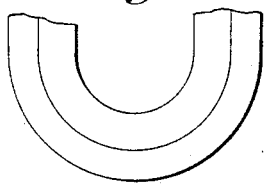
Figure 4:
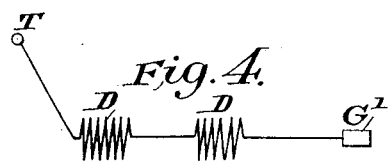

Referring to the drawings, Figure 1 is a plan view, partly in section, of the inside of a controller embodying the features of my invention. Fig. 2 is a front view of the same, the central portions of the view being broken away. Fig. 3 is an end view of one of the coils D D, similarly broken away. Fig. 4 is a diagram showing how I prefer to electrically connect the coils D D.

Within the casing A is the operating-drum B and a reversing and cut-out drum B', rotatable, respectively, with the movements of vertical shafts C and C', to which are secured suitable levers, which I do not here show.

D D are coils composed of a number of turns of insulated wire $d$, the whole being covered with a suitable insulator, as asbestos. D D are supported by wooden blocks E E, secured to the bottom of the casing. The drum B, which I prefer to make largely out of magnetic material, rotates within said coils, the winding of the coils and their position relative to the drum being such that the opposite sides of the drum become opposite magnetic poles when current flows through $d$. As the drum is rotatable and the coils are stationary, the pole portions of the drum change as it rotates, but will always bear the same relation to the fixed portions of the controller, including the fixed contact-fingers contiguous to drum B. I therefore place the coils in such positions relative to the position of the fixed fingers that will cause one of the poles of the drum to be at or near the contact portions of the fingers. By such an arrangement I am enabled to extinguish quickly any arcs which tend to form when the drum is rotated.

If it is desirable to make the drum B without magnetizable material as a part of its make-up, the same arc-extinguishing effect may be obtained by adding more turns of the wire $d$ to the coils. With such an arrangement free magnetism would be depended upon altogether.

It is not essential to the effectiveness of the device, although it is preferable, to have two coils, as shown, as with one coil surrounding the free ends of the series of contact-fingers the same result may be obtained by adding more turns of the wire $d$.

F is the finger-board, upon which are secured the fixed fingers, adapted to contact with the drum B. F' is a similar finger-board for the fingers adapted to contact with drum B'.

Secured in recesses in F are the binding-posts G', to one end of which suitable connection is made with any desired part of the circuit. The other end of G' extends toward the drum B.

$G^3$ is a flat spring secured between the members G' and $G^2$ by screw $o$.

$G^4$ is a contact secured to the free end of $G^3$. The pressure between $G^4$ and the drum may be adjusted by the screw $o'$.

The members G', $G^2$, $G^3$, and $G^4$, secured together as described, constitute a compact and effective contact-finger and is one of the series adapted to contact with B.

Extending from and secured to the back of the controller is the projecting support K, which extends between the plates H and H', surrounding, respectively, the shafts C and C'. Within a transverse opening through K are the members J, J', and S, which, together with the disks H and H', comprise a novel, simple, and effective form of combined interlocking and step-by-step device for the two controller-switches. J has a rounded end adapted to engage the periphery of H'. J' has a similar end adapted to engage the periphery of H.

S is a spiral spring fitting within a cavity formed by openings in both J and J'. S is adapted to press each locking member toward its respective plate. J' may slide within the opening in K and J may slide within J'.

The plates H and H' have depressions in their periphery corresponding circumferentially with the operative positions of the switches to which they belong. In Fig. 1 both switches are at the "off" position. In this position J' engages a depression in the periphery of H, said depression being deeper than any of the other depressions in the same plate. Because of the depth of this depression the plate H' is enabled to rotate freely, the pressure of S being merely sufficient to produce the desired step-by-step effect. If J is in one of the depressions of H' and J' is engaging any portion of the periphery of H except that portion which it is shown as engaging, Fig. 1, H' cannot be moved. I am therefore enabled by the use of my invention to automatically produce the desired step-by-step effect to prevent the reversing and cut-out switch from being moved except when the operating-switch is at the "off" position and to prevent the operating-switch from being moved when the reversing and cut-out switch is at the "off" position.

I desire to be understood as limiting myself neither to the exact details shown and described nor to the use of my improvements with the exact type of controller shown.

Having thus described my invention, what I claim, and desire to protect by Letters Patent, is—

1. In an electric controller, in combination, a rotatable drum carrying a plurality of contacts, and a coil surrounding a part of said drum and electrically connected to any suitable part of the circuit.

2. In an electric controller, in combination, a rotatable drum, a plurality of fixed fingers contiguous thereto, and a coil electrically connected to any suitable part of the circuit and surrounding said plurality of fingers at their contact ends.

3. In an electric controller, in combination, a rotatable drum, a plurality of fixed fingers contiguous thereto, and a coil electrically connected to any suitable part of the circuit, the periphery of said drum being free to rotate within said coil.

4. In an electric controller, in combination, the operating-drum of the controller carrying a plurality of contacts, a series of fixed fingers contiguous thereto, a coil electrically connected to any suitable part of the circuit and surrounding a portion of said drum.

5. In an electric controller, in combination, the operating-drum of the controller constructed in part of magnetizable material, and energizing-coils, for directly magnetizing said drum.

6. In an electric controller, an electromagnetic arc-interrupter comprising the operating-drum of said controller and suitable energizing-coils surrounding a part of said drum.

7. An electromagnetic arc-interrupter for electric controllers comprising the operating-drum of said controller and coils for directly magnetizing said drum.

8. In an electric controller, a member constituting the core of an electromagnetic arc-interrupter and the operating-switch of the controller.

9. In an electric controller, in combination, a rotatable drum composed in part of magnetic material, a plurality of fixed fingers contiguous thereto, and coils for directly magnetizing said drum, one of the magnetic poles of the magnetized drum being at or near the contact portions of said plurality of fingers.

10. In an electromagnetic arc-interrupter for electric controllers, a combined operating-drum and magnet-core, one of the poles of the magnet being substantially at the contact-breaking portions of said drum.

11. In an electric controller, in combination, a rotating shaft, a drum rotatable with said shaft, field-coils contiguous to, parallel with and adapted to energize said drum, and fixed fingers adapted to make contact with said drum.

12. In an electric controller, in combination, a support K rigidly secured between two rotatable disks, two stops sliding within said support, means for pressing the stops toward said disks and means for limiting the range of movement of said stops.

13. An interlocking or step-by-step device comprising, in combination, two rotatable disks, a rigid support between said disks, stops adapted to engage the peripheries of said disks, one of said stops being carried by the rigid support, the other of said stops being carried within the first-mentioned stop, a spring in a cavity within said stops adapted to press them in opposite directions toward said disks.

In testimony whereof I have affixed my signature in presence of two witnesses.

SAMUEL HARRIS.

Witnesses:
ALFRED J. GAIRING,
H. W. SMITH.